(12) United States Patent
Schenk

(10) Patent No.: US 6,325,445 B1
(45) Date of Patent: Dec. 4, 2001

(54) MOTOR VEHICLE WITH A BODY

(75) Inventor: Bernhard Schenk, Böblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/649,304

(22) Filed: Aug. 28, 2000

(30) Foreign Application Priority Data

Aug. 28, 1999 (DE) .............................. 199 40 959

(51) Int. Cl.$^7$ .............................. B62D 25/10; B60J 7/20
(52) U.S. Cl. ........................ 296/107.08; 296/76
(58) Field of Search ................ 296/76, 107.08, 296/116, 117, 136

(56) References Cited

U.S. PATENT DOCUMENTS

| | | | |
|---|---|---|---|
| 2,737,254 | * | 3/1956 | Bayley .............................. 180/69.21 |
| 3,767,001 | * | 10/1973 | Chupick .............................. 180/69.21 |
| 5,551,743 | * | 9/1996 | Klein et al. .............................. 296/76 |
| 5,758,923 | * | 6/1998 | Kolb .................................... 296/107 |
| 6,010,178 | * | 1/2000 | Hahn et al. ...................... 296/107.08 |
| 6,092,335 | * | 7/2000 | Queveau et al. ......................... 49/192 |
| 6,186,577 | * | 2/2001 | Gucket et al. .................. 296/107.07 |
| 6,193,300 | * | 2/2001 | Nakatomi et al. .............. 296/107.08 |

FOREIGN PATENT DOCUMENTS

| | | | |
|---|---|---|---|
| 4203871 | * | 8/1993 | (DE) ........................................ 296/76 |
| G 93 11 798.1 | | 8/1993 | (DE) . |
| 44 45 944 C1 | | 12/1994 | (DE) . |
| 195 16 877 C1 | | 5/1995 | (DE) . |
| 195 25 587 C1 | | 7/1995 | (DE) . |
| 197 37 059 A1 | | 8/1997 | (DE) . |
| 197 56 062 C1 | | 12/1997 | (DE) . |
| 1408925 | | 7/1964 | (FR) . |

* cited by examiner

*Primary Examiner*—Stephen T. Gordon
*Assistant Examiner*—Paul Chenevert
(74) *Attorney, Agent, or Firm*—Crowell & Moring LLP

(57) ABSTRACT

A motor vehicle, in particular a convertible, is provided with a body that has at least one closure cover, which can be moved into an open and a closed position by an extendable driving device, and has the following features: in a front or rear end region, the closure cover can be connected to the body by at least one connecting device. The connecting device has a receiving element and an engagement element, provided for engagement in the receiving element. The connecting device limits the travel of the closure cover in at least one direction during the closing movement of the closure cover. At the opposite end to the connecting device, the closure cover or a component connected to the closure cover is rotatably mounted at least one pivot. The at least one pivot is connected pivotably to the body by at least one associated lever element.

11 Claims, 2 Drawing Sheets

MOTOR VEHICLE WITH A BODY

FIELD OF INVENTION

The invention relates to a motor vehicle, in particular a convertible, with a body that has at least one closure cover, which can be moved into an open and a closed position by means of a driving device.

BACKGROUND

DE 44 45 944 C1 relates to a hard-top vehicle in which the roof components of the hard top can be lowered into a folding-top compartment, which can be locked by means of a rear flap. The rear flap has an auxiliary frame which is arranged pivotably at the rear of the vehicle and, on its side facing away from the rear, can be connected firmly to the body by means of corresponding locking devices. The rear flap is held in its closed position by a hydraulic cylinder.

DE 195 16 877 C1 relates to a hard-top vehicle of very similar construction in which the locking device, which is situated at the front of the rear flap, can be opened by means of a Bowden cable.

In the case of both the known vehicles, however, the locking device, required for proper locking of the rear flap, at the front of the rear flap is disadvantageous since it necessitates very high accuracy of manufacture and therefore leads to increased costs in addition to the outlay arising from the locking device itself and to additional outlay on control.

DE 197 56 062 C1 relates to a convertible in which the rear cover is connected to the body by a multi-link hinge. A two-piece auxiliary frame is also connected pivotally to this multi-link hinge. At the rear of the rear cover there is a further locking device, which allows the rear cover to be opened to load the luggage compartment.

However, the various joints with the locking devices necessary for them require a relatively high outlay on design and, in particular, control, which leads to additional costs.

SUMMARY

The present invention provides, among other things, a motor vehicle with a body having at least one closure cover, in which the closure cover is of simple construction and thus gives rise to low costs but, at the same time, operates reliably. Moreover, the tolerances which are possible in the manufacture of the closure cover and of the components provided for the purpose of connecting the closure cover to the body should be as large as possible.

Thanks to the connecting device used in accordance with the invention to connect the closure cover to the body, it is possible to dispense with the previously required locking devices. Eliminating the previously required locking device in this way makes possible considerable cost savings, not only by dispensing with the locking device itself but also by allowing wider tolerances in the manufacture and assembly of the closure cover since much wider tolerances can be permitted for the connecting device according to the invention.

This furthermore ensures reliable opening and, especially, closure of the closure cover since the source of potential errors involved in locking the locking device is no longer present. According to the invention, the closure cover is now locked by turning the closure cover about the pivot and pivoting the latter about the lever element connecting the pivot to the body.

If, in a very advantageous refinement of the invention, the closure cover is elastically deformable and, during the closing movement of the closure cover, can be moved over the pivot into a dead centre position by means of the driving device, there is no need for any further device to lock the closure cover relative to the body. On the contrary, in this case the closure cover itself is used as a resilient element which is pivoted relative to the body and over a dead centre position by means of the driving device, owing to the presence of the lever element and can no longer be moved out of this dead centre position without the action of the driving device.

As an alternative, in another refinement of the invention it is possible for the closure cover to be held in the closed position by the driving device and it is possible to dispense with elastic deformability of the closure cover.

Locking of the rear cover is performed at the end opposite the end having the connecting device.

Further advantageous refinements and developments of the invention will become apparent from the remaining subclaims and from the exemplary embodiment, which is described diagrammatically below with reference to the drawing, in which:

DESCRIPTION OF EMBODIMENTS

Figure 1:
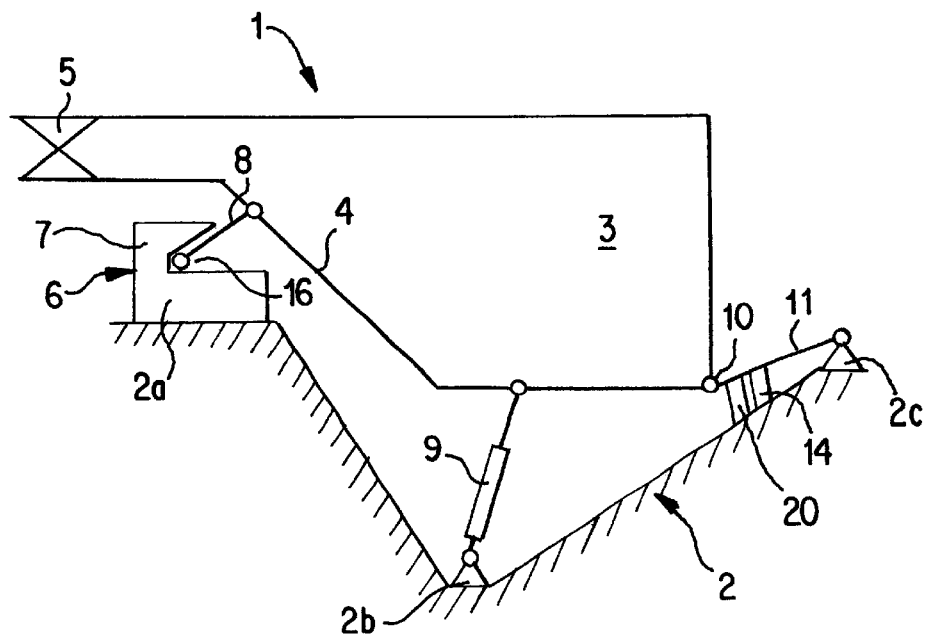
FIG. 1 shows a schematic representation of the closure cover of the motor vehicle according to the invention in a closed position.

FIG. 1 shows a closure cover 1 for a body 2 of a motor vehicle, which is not shown in its entirety. The body 2, has three fastening points 2a, 2b and 2c.

Figure 3:
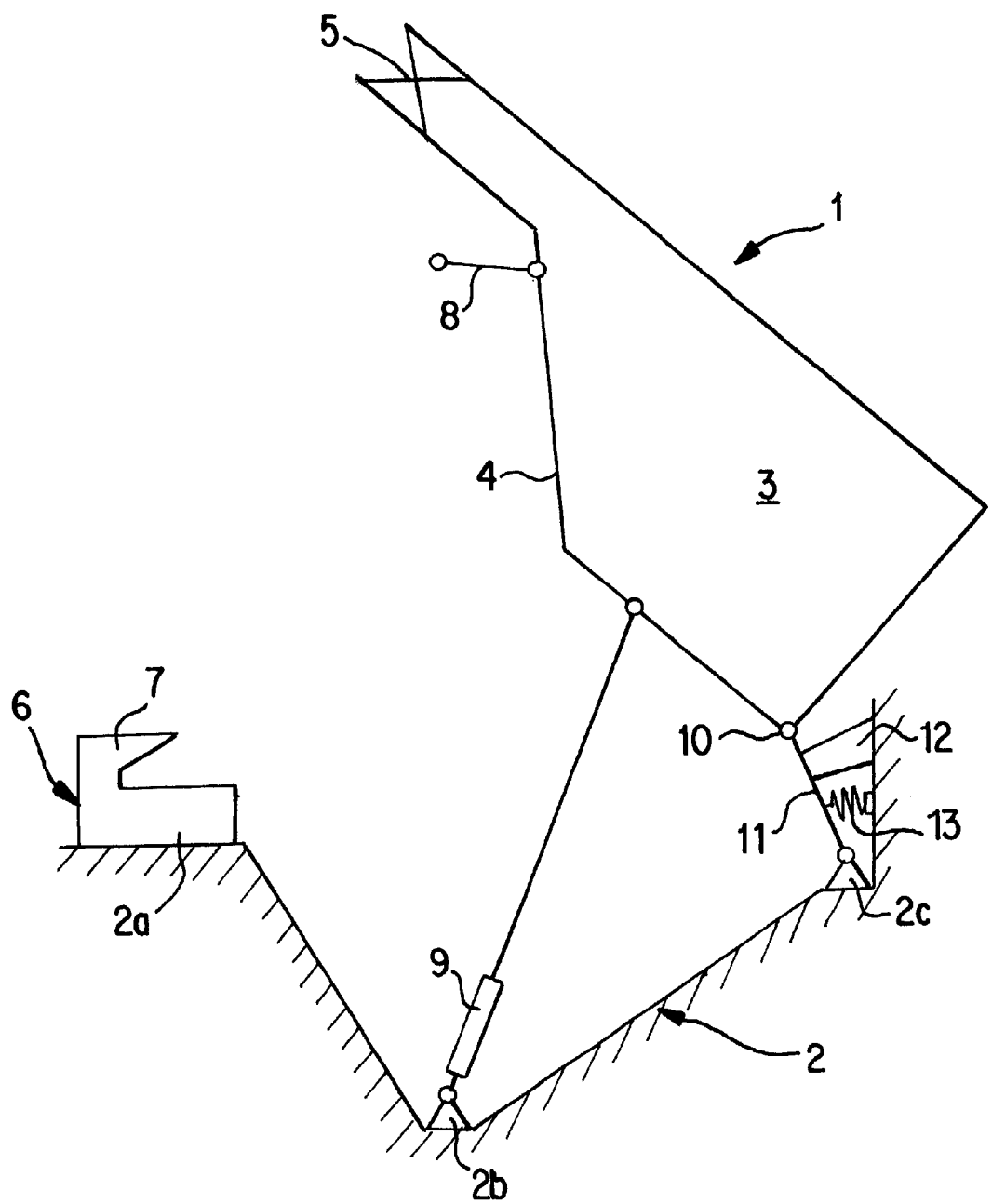
FIG. 3 shows the closure cover from FIG. 1 and FIG. 2 in the open position.

The closure cover 1 is designed as a luggage-compartment cover, which closes or exposes a luggage compartment 3 of the motor vehicle. Since the motor vehicle is a convertible, the closure cover 1 can assume not only the position which is not shown in the figures though known per se, in which it exposes the luggage compartment 3 for loading, but also another open position, in which a folding top (not shown) or a variable roof of the motor vehicle can be placed in the luggage compartment 3. This open position of the closure cover 1 is shown in FIG. 3.

The closure cover 1 has an auxiliary frame 4, which comprises round-section tubes, for example, and to which it is connected at its front end by a hinge device 5. In its closed position, the closure cover 1 is connected to the body 2 at fastening point 2a by a connecting device 6. For this purpose, the connecting device 6, which is likewise situated at the front end of the closure cover 1, has a receiving element 7 mounted on the body 2 and an engagement element 8, which is mounted on the auxiliary frame 4 of the closure cover 1 and is intended to engage in the receiving element 7. In this arrangement, the receiving element 7 is designed as a slotted guide, and the engagement element 8 is provided with a roller 16. Instead of the roller 16, the engagement element 8 could also have a pin 18 (shown in FIG. 2) or the like, for example. Contrary to the illustration in the figures, it would also be possible for the receiving element 7 to be situated on the closure cover 1 and the engagement element 8 to be situated on the body 2, but its operation as described below would not thereby be impaired. In the case of certain applications, it would furthermore also be conceivable to mount the connecting device 6 at the rear of the closure cover 1.

Instead of the roller, the engagement element 8 could also have a pin or the like, for example. Contrary to the illustration in the figures, it would also be possible for the receiving element 7 to be situated on the closure cover 1 and the engagement element 8 to be situated on the body 2, but its operation as described below would not thereby be impaired. In the case of certain applications, it would furthermore also be conceivable to mount the connecting device 6 at the rear of the closure cover 1.

For the purpose of moving the closure cover 1 there engages on the auxiliary frame 4 a driving device 9, which can be designed in a manner known per se as a linear drive, e.g. as a cylinder/piston unit, and is supported on the body 2 at fastening point 2b. Naturally, other driving devices 9 are also possible, e.g. electric linear drives, rotary drives or combinations of linear and rotary drives. At the rear of the closure cover 1, that is to say at the opposite end from the connecting device 6, the auxiliary frame 4 has a pivot 10, about which the auxiliary frame 4 can be rotated together with the closure cover 1. The pivot 10 is connected to the body 2 at the fastening or pivoting point 2c by an associated lever element 11 and can thus be pivoted relative to the body 2. With the lever element 11 and the fastening point 2c, the pivot 10 thus forms a double joint for the closure cover 1.

Figure 2:
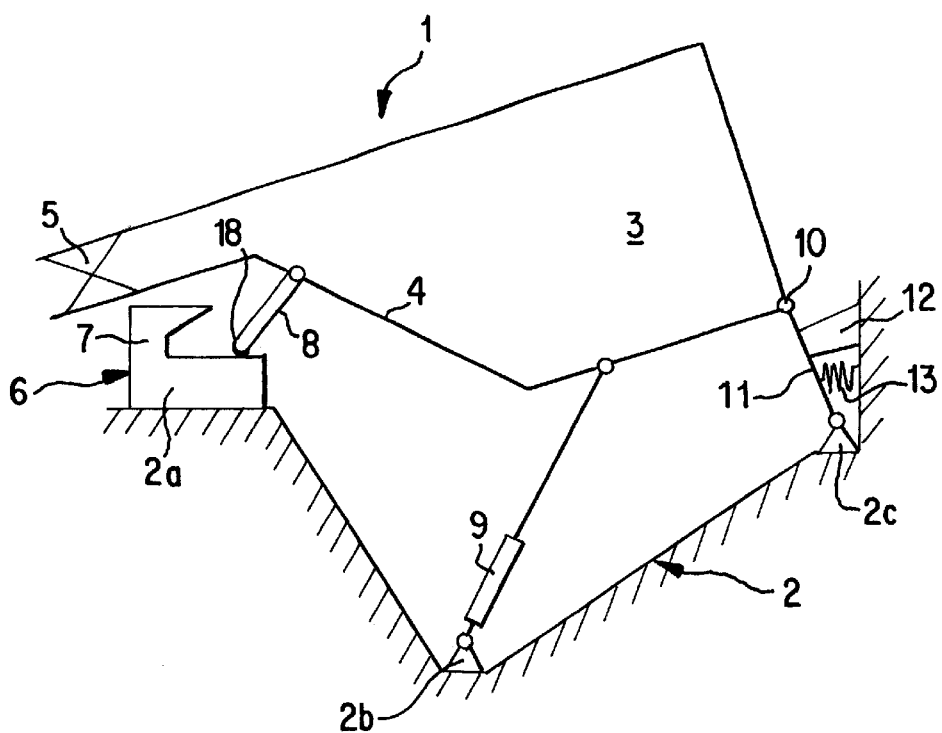
FIG. 2 shows the closure cover from FIG. 1 in an intermediate position during the opening movement.

To open the closure cover 1, the driving device 9 is extended, as a result of which, on the one hand, the pivot 10 is pivoted by the lever element 11 about the fastening point 2c and hence about the body 2 and, on the other hand, the engagement element 8 moves out of the receiving element 7. As soon as the engagement element 8 has moved completely out of the receiving element 7, as illustrated in FIG. 2, all that occurs subsequently is a rotary motion of the closure cover 1 and of the auxiliary frame 4 about the pivot 10. Further movement of the lever element 11 is prevented by a stop element 12, a friction device or a similar component.

The closing movement of the closure cover 1 takes place in the reverse order, i.e. the closure cover 1 and the auxiliary frame 4 are first of all rotated about the pivot 10 until the engagement element 8 engages in the receiving element 7. During this movement, the lever element 11 and the pivot 10 are held in the position shown in FIG. 2 by a spring element 13 until the engagement element 8 touches the receiving element 7. Instead of the spring element 13, it would also be possible to use some other suitable element. The pivot 10 is then pivoted about fastening point 2c together with the closure cover 1 and the auxiliary frame 4 by means of the lever element 11, more specifically up to the point at which the engagement element 8 is completely in engagement with the receiving element 7 and the closing movement of the closure cover 1 in the longitudinal direction of the motor vehicle is thus limited. Limitation of the closing movement of the closure cover 1 in another direction, e.g. in a vertical direction, would also be conceivable. In the position described, further rotary motion of the lever element 11 is prevented by a stop element 14. In this case, the connecting device 6 is thus completely closed and all that is then required is to lock the closure cover 1 relative to the body 2.

This is achieved by pivoting the auxiliary frame 4 about fastening point 2c with the pivot 10, by means of the lever element 11, until the auxiliary frame 4 is in a dead centre position. During this process, the auxiliary frame 4 is deformed elastically, that is to say used to some extent as a spring element, and moved into the dead centre position, thereby reliably locking the closure cover 1 and allowing it to be reopened merely by the application of force by the driving device 9. This is also made possible by the fact that the engagement element 8 is completely in the receiving element 7, and a movement of the closure cover 1 in the longitudinal direction of the motor vehicle is thus prevented. The force to be applied by the driving device 9 when opening the closure cover 1 depends on how far the closure cover 1 has been moved over the dead centre position and on the stiffness of the auxiliary frame 4.

In an embodiment which has not been shown, it would also be possible to construct the closure cover 1 without an auxiliary frame 4, in which case the closure cover 1 itself would be elastically deformable and thus capable of being moved into its dead centre position. In this case, the closure cover 1 could be designed both as a luggage-compartment cover and as a cover for a folding-top compartment and, as described above, would be both rotatable about the pivot 10 and pivotable by means of the lever element 11 about fastening point 2c since the kinematics would be the same.

It would furthermore be conceivable to make neither the auxiliary frame 4 nor the closure cover 1 elastically deformable and, instead, to hold the closure cover 1 in the closed position by means of the driving device 9 as soon as the connecting device 6 limits the movement of the closure cover. As an alternative, it would furthermore be conceivable to lock the closure cover 1 relative to the body 2 by means of a locking element (not shown) 20 (shown in FIG. 1) mounted on the lever element 11.

The abovementioned fastening points 2a, 2b, 2c, the connecting device 6 with the receiving element 7 and the engagement element 8, and the driving device 9 can of course be mounted on both sides of the closure cover 1 but, for the sake of simplicity, only one of the two elements which are actually present is described in each case. There can also be two pivots 10 and two associated lever elements 11 but, as mentioned above, these are not located at the sides of the closure cover 1 but at the rear or rear end of the latter.

What is claimed is:

1. A vehicle comprising:
   a body;
   a closure cover;
   a lever element having a first pivot connection to an end of the closure cover and a second pivot connection to the body;
   at least one connecting device having an engagement element releasably connected to a receiving element, the engagement element coupled to the closure cover opposite the lever element and the receiving element adapted to be fixedly connected to the vehicle body and act as a guide and stop for the engagement element; and
   an extendable driving device pivotally attached to the closure cover between the lever element and the connecting device such that extension of the driving device causes the closure cover to first pivot in one direction elevating the first pivot connection of the lever element until the receiving element releases the engagement element, then in the opposite direction about the elevated first pivot connection to expose the area under the closure cover.

2. The vehicle of claim 1 wherein the closure cover is elastically deformable.

3. The vehicle of claim 2 wherein the closure cover can be moved over the pivot into a dead center position by means of the driving device and locked relative to the body.

4. The vehicle of claim 2 wherein the closure cover has an auxiliary frame with an intrinsic ability for elastic deformation which, during the closing movement of the closure cover, can be moved over the pivot into the dead center position by means of the driving device means and locked relative to the body.

5. The vehicle of claim 2 wherein the closure cover is designed as a luggage-compartment cover with an intrinsic ability for elastic deformation which, during the closing movement of the closure cover, can be moved over the pivot into the dead center position by means of the driving device means and locked relative to the body.

6. The vehicle of claim 2 wherein the closure cover is designed as a folding-top compartment cover with an ability for elastic deformation which, during the closing movement of the closure cover, can be moved over the pivot into the dead center position by means of the driving device and locked relative to the body.

7. The vehicle of claim 1 wherein the closure cover can be locked relative to the body by means of a locking element mounted on the lever element.

8. The vehicle of claim 1 wherein the receiving element is arranged on the closure cover and the engagement element is arranged on the body.

9. The vehicle of claim 1 wherein the receiving element is arranged on the body and the engagement element is arranged on the closure cover.

10. The vehicle of claim 1 wherein the receiving element includes a slotted guide and the engagement element includes a pin.

11. The vehicle of claim 1 wherein the receiving element includes a slotted guide and the engagement element includes a roller.

* * * * *